Figure 1:
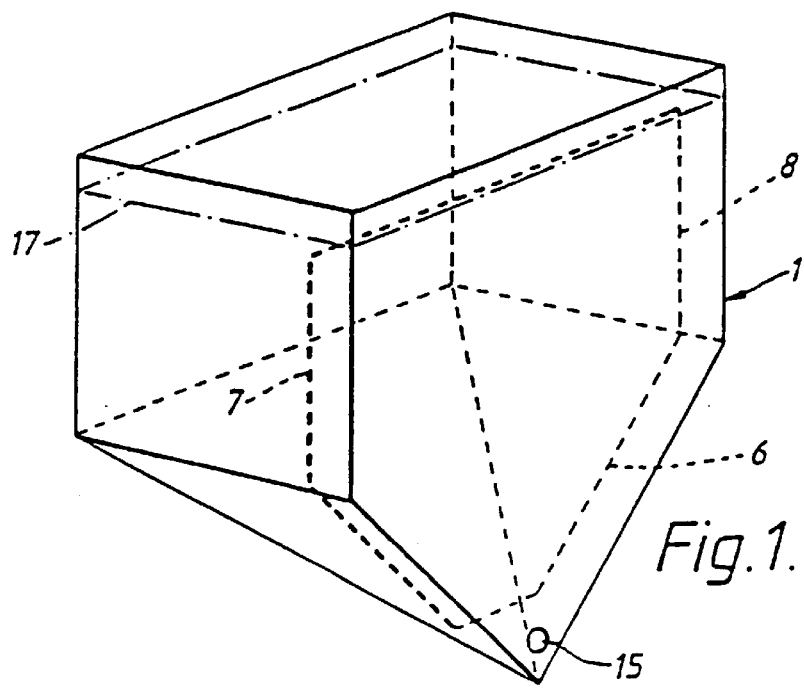

United States Patent [19]

Foster

[11] Patent Number: 5,833,829
[45] Date of Patent: *Nov. 10, 1998

[54] PROTECTIVE COATING

[75] Inventor: John Foster, Avon, England

[73] Assignee: Praxair S.T. Technology, Inc., Danbury, Conn.

[*] Notice: The term of this patent shall not extend beyond the expiration date of Pat. No. 5,824,205.

[21] Appl. No.: 619,722

[22] PCT Filed: Jul. 24, 1995

[86] PCT No.: PCT/GB95/01746

§ 371 Date: Jul. 16, 1996

§ 102(e) Date: Jul. 16, 1996

[87] PCT Pub. No.: WO96/03536

PCT Pub. Date: Feb. 8, 1996

[30] Foreign Application Priority Data

Jul. 22, 1994 [GB] United Kingdom .................... 9414858

[51] Int. Cl.$^6$ ................................... C25D 15/02
[52] U.S. Cl. .................. 205/109; 205/170; 205/176; 205/181; 205/191; 205/194; 205/195; 205/227; 205/228
[58] Field of Search .................... 205/109, 110, 205/191, 192, 194, 195, 227, 228, 170, 176, 181

[56] References Cited

U.S. PATENT DOCUMENTS

| 4,411,742 | 10/1983 | Donakowski et al. ..................... 204/16 |
| 4,598,016 | 7/1986 | Thoma et al. ........................... 428/328 |
| 4,789,441 | 12/1988 | Foster et al. ............................ 204/37.1 |
| 4,810,334 | 3/1989 | Honey et al. ............................ 204/16 |
| 4,880,614 | 11/1989 | Strangman et al. .................... 428/623 |
| 5,037,513 | 8/1991 | Foster ...................................... 204/16 |
| 5,500,252 | 3/1996 | Meelu .................................. 427/376.3 |

*Primary Examiner*—Bruce F. Bell
*Assistant Examiner*—William T. Leader
*Attorney, Agent, or Firm*—Douglas E. Denninger

[57] ABSTRACT

A method of producing a coating on a substrate by electrolytically co-depositing a metal matrix $M_1$ and particles of $CrAlM_2$, where $M_1$ is Ni, Co or Fe or two or all of these elements and $M_2$ is Y, Si, Ti, Hf, Ga, Nb, Mn, Pt, a rare earth element or two or more of these elements. The co-deposition is carried out at a current density of less than 5mA per square centimeter. Preferably, the co-deposition forms a layer less than 50 microns thick, and occurs at a bath loading of less than 40 grams per liter of the particles. In a preferred embodiment, the particle size distribution in the plating bath is 25 percent between 15 and 12 microns, 45 percent between 12 and 10 microns and 30 percent less than 10 microns. The method is particularly useful for coating a gas turbine part.

10 Claims, 2 Drawing Sheets

PROTECTIVE COATING

This is a national stage application of PCT/GB95/01746 filed Jul. 24, 1995.

The present invention relates to the provision of protective coatings, such as overlay coatings, on substrates. Such coatings are employed on components which are subjected to high temperature environments, particularly where corrosion and/or erosion is likely to occur. The primary but not necessarily sole application of such coatings is to parts of gas turbine engines, particularly superalloy components thereof, such as gas turbine shafts, rings, disks, combustion can ware, stator and rotor blades and guide vanes. The invention also relates to such parts, and to machinery and vehicles or fixed installations which incorporate such parts.

It has long been recognised that components of gas turbines, particularly the internal components thereof in the vicinity of and downstream of the combustor, need to exhibit high strength and corrosion resistance at high temperature.

It is known to provide such components with a load bearing structure of superalloy material, to provide sufficient high temperature strength. Typical superalloys used (examples are those known under the trade designations IN100, IN718, IN738, MAR-M002, MAR-M247, CMSX-4, PWA1480 and PWA1484) are the Ni, Co and Fe base superalloys, dependent upon the particular application requirements. Fe and Co base superalloys are often solid solution strengthened. Ni base alloys have Ni as the major constituent and often contain amounts of Cr Co Fe Mo W or Ta, and are often solid solution or precipitation strengthened. Precipitation strengthened Ni base alloys are widely used for gas turbine components and often contain Al Ti or Nb to produce a precipitated second phase in the course of a suitable heat treatment. Examples of Ni base precipitation strengthened superalloys used for gas turbine components are those known under the trade designations INCO 713, B-1900, IN 100, MAR-M 200, and MAR-M 247. Examples of Co base superalloys are MAR-M 509 and Haynes 188, and examples of Fe base superalloys are Incoloy 802 and Incoloy 903. Superalloy gas turbine components are sometimes wrought or cast and, for the more extreme operating conditions, may be directionally solidified or in the form of single crystal structures.

It has become common practice to coat superalloy components with corrosion resistant material since the superalloy itself will not normally be capable of withstanding the corrosive/oxidative in-service atmosphere.

One practice is to aluminise the superalloy. This is usually accomplished using a so-called pack aluminising process, or by physical vapour deposition. These processes involve diffusion of Al into the superalloy to form aluminides such as NiAl in the case of Ni base superalloys. In service, a surface layer of $Al_2O_3$ forms to protect the material beneath and this tends to exfoliate due to thermal expansion and contraction. This is gradually repaired by outwardly diffusing Al and finally, when there is no longer sufficient Al to replace exfoliated material at a particular location, the superalloy component will be liable to rapid localised corrosion. Chromium and silicon either together or singly and alone or in addition to aluminium may likewise be diffused into the superalloy to form a surface layer including chromides or silicides. Although reference will be made hereafter mainly to aluminising it should be understood that such reference should be interpreted as alternatively referring mutatismutandis to chromising and/or siliconising.

A further practice is to coat the superalloy with an overlay of, for example, MCrAlY, MCrAlHf, MCrAlYHf, MCrAlYHfSi and MCrAlTaY where M is Co or Ni or Fe or a mixture thereof. The addition of Y Si or Hf helps to prevent exfoliation of $Al_2O_3$ from the surface and thus extends the life of the component. These materials may be applied by plasma spraying; or by a co-deposition process, such as the process we describe in our patent GB-B-2 167 446. It is usual to coat a component with these materials to produce a layer 75 to 200 μm or more in thickness. The coating processes are expensive and coating components to this order of thickness gives them a life long enough to justify the cost.

A problem with layers of this order of thickness is that they tend to be susceptible, as in-service conditions become gradually more extreme in more modern gas turbines, to thermal mechanical fatigue cracking and this is highly undesirable, particularly if the coating is applied to a thin-walled hollow superalloy component such as a turbine blade, since the cracking of the coating can cause blade failure.

U.S. Pat. No. 4 897 315 describes plasma spraying of a 0.001 inch (25.4 μm) layer of NiCoCrAlY on to single crystal Ni base superalloy. After plasma deposition, the coating is glass bead peened, aluminised with a pack cementation mixture, and is, finally, put through diffusion and precipitation heat treatment steps. The specification indicates that the preferred method of applying the MCrAlY coating is by plasma spraying, but the specification also makes a general statement that the MCrAlY can be applied by, e.g., plasma spraying, electron beam evaporation, electroplating, sputtering, or slurry deposition. One reason for the peening operation in the prior art is thought to be that the as-deposited MCrAlY is not particularly smooth.

Although U.S. Pat. No. 4 897 315 mentions other ways to deposit the MCrAlY, no particular process is known which is capable of producing a coating which has both excellent corrosion resistance and excellent resilience to thermal cycling. It is believed that any known plating method either produces a coating which is too porous with poor thickness control on some sections, or is susceptible to cracking under thermal cycling.

In our patent GB-B-2 254 338, we disclose a method of co-depositing CoCrAlY with a current density of 3 mA per square centimetre and bath powder concentration of 70 g/l for a period of 24 hours to produce a coating thickness of between 50 and 125 μm. Although some of the plating parameters described in GB-B-2 254 338 are of similar magnitude to those used in the example set out below to illustrate the present invention, the differences are believed to have significant effects on the structure of the coating produced in practice. GB-B-2 254 338 is directed specifically towards an apparatus and process for overcoming the problems of coating complex or abruptly changing shapes, and is not directed towards solving the same problems as those the present invention sets out to solve.

The present invention aims to alleviate the problems of the prior art and, in particular, aims to provide a process capable of producing a coating which is non-porous, smooth with good thickness control on all sections, and which is not easily susceptible to cracking under thermal cycling.

According to a first aspect of the present invention there is provided a method of producing a coating on a substrate which comprises depositing by electrolytic deposition a metal matrix $M_1$ from a bath containing particles of $CrAlM_2$ so as to co-deposit the particles with the matrix, $M_1$ being Ni or Co or Fe or two or all of these elements and $M_2$ being Y, Si, Ti, Hf, Ta, Nb, Mn, Pt, a rare earth element or two or more of these elements, the deposition being carried out at a current density of less than 3 mA per square centimetre.

According to a second aspect of the present invention there is provided a method of producing a coating on a substrate which comprises depositing by electrolytic deposition a metal matrix $M_1$ from a bath containing particles of $CrAlM_2$ so as to co-deposit the particles with the matrix in the form of a layer, $M_1$ being Ni or Co or Fe or two or all of these elements and $M_2$ being Y, Si, Ti, Hf, Ta, Nb, Mn, Pt, a rare earth element or two or more of these elements, the deposition being carried out at a current density of less than 5 mA per square centimetre, the layer being less than 50 $\mu$m thick.

According to a third aspect of the present invention there is provided a method of producing a coating on a substrate which comprises depositing by electrolytic deposition a metal matrix $M_1$ from a bath containing particles of $CrAlM_2$ so as to co-deposit the particles with the matrix, $M_1$ being Ni or Co or Fe or two or all of these elements and $M_2$ being Y, Si, Ti, Hf, Ta, Nb, Mn, Pt, a rare earth element or two or more of these elements, the deposition being carried out at a current density of less than 5 mA per square centimetre and at a bath loading of less than 40 g/l of the particles.

In each above aspect, where not mentioned as a feature of the aspect, it is preferable for the process to be carried out at a current density of less than 3 mA per square centimetre. Likewise, it is preferable for the matrix material and particles to be co-deposited in the form of a layer with thickness less than 50 $\mu$m; likewise, it is preferable for the deposition to be carried out at a bath loading of less than 50 g/l of the particles.

In this invention, we have found that a relatively low current density is a particularly important parameter in the coating process. Previous to the present invention the current density had not been thought particularly important in most plating processes and, where it has been considered important, it has been considered desirable to plate at a significantly higher current density; see, for example, U.S. Pat. No. 5 064 510 where a current density of 50 to 80 mA per square centimetre is used and is said to achieve advantageously a high deposition rate within the range of 100 $\mu$m/h to 150 $\mu$m/h.

It is considered that there is a prejudice in the art against using a relatively low current density; the reason for this is not known exactly but one explanation may be that the coating process is slower at low current densities thus adversely affecting the overall cost.

In this invention, we prefer a current density of less than 2.5 mA per square centimetre. A current density of less than about 2 mA per square centimetre is even more preferable in some circumstances, a current density of about 1 mA per square centimetre being one example.

At the relatively low current densities employed in this invention, we note a tendency for the constitution of particles on the as deposited coating to differ from the constitution in the bath, in that smaller particles are preferentially incorporated (eg using <15$\mu$m powder, the >10 $\mu$m particles are not incorporated so preferentially as the <10 $\mu$m particles). This is particularly surprising since, in theory based upon Faraday's Law and Stokes' equation (see Transactions of the Institute of Metal Finishing, article entitled: "The Production of Multi-Component Alloy Coatings by Particle CoDeposition," by J. Foster et al, pp. 115–119, Vol. 63, No. 3–4, 1985) and assuming suitable conditions of current density and agitation are used, the larger the particle size the smaller the bath loading needs to be to achieve a particular fraction of powder incorporated in the as deposited coating. One would therefore expect larger particles to be preferentially plated, but we have found that at relatively low current densities, the opposite occurs. This phenomenon which occurs in practice is thought to be at least partly responsible for the excellent coatings which are achievable in the present invention and which overcome the problems of the prior art.

In one embodiment, the $M_1$ comprises Co. This helps to promote a particularly smooth coating. If it is desirable for Ni to be present in the coating, a flash of Ni may be electroplated either on top of the co-deposited material, or directly onto the substrate before the co-deposition step. The flash of Ni may be about 5 $\mu$m thick.

It is preferred for the metal matrix material and particles to be co-deposited to form a layer less than 25 $\mu$m thick. In a particularly preferred embodiment, the layer may be about 15 $\mu$m thick. However, the layer may be less than 15 $\mu$m thick, about 12 or 10 $\mu$m (or less than these values) being examples. For most applications, it is preferable for the layer to be more than or equal to 5 $\mu$m thick, more preferably still for it to be more than or equal to 10 $\mu$m thick. However, the layer may, for some applications, be more than 15 $\mu$m thick.

As mentioned above, it is preferable for the deposition to be carried out at a bath loading of less than 40 g/l of the particles. More preferably, a bath loading of about 30 g/l, or less than 30 g/l, is used. More preferably still, a loading of about 20 g/l, or less than 20 g/l, is used. In a particularly preferred embodiment, a bath loading of about 10 g/l is used, although lower loadings, such as about 1 g/l, are envisaged. These relatively low bath loadings ensure that the deposited coating does not build up in a porous manner and is not rough.

The particles may be spherical, and may be formed using an atomiser, such as a nozzle atomiser. Preferably the particles in the bath comprise <15 $\mu$m <12 $\mu$m, or <10 $\mu$m powder.

In one preferred embodiment, the particle distribution in the bath consists of 25% between 15 and 12 $\mu$m, 45% between 12 and 10 $\mu$m, and 30% less than 10 $\mu$m. We have found, surprisingly and unexpectedly, that plating at relatively low current densities results in small particles being preferentially deposited onto the substrate; when powder with this in-bath distribution is used, a distribution in the as-deposited coating (as a weight percentage of the amount of powder in the deposit) of 45% <10 $\mu$m, 55% between 10 and 12 $\mu$m, and 0% between 12 and 15 $\mu$m may result.

Excellent coatings are achievable with processes incorporating this refinement step and, preferably, a refinement step is included in the co-deposition step.

In one embodiment, a layer of protective material is co-deposited which comprises only a mono-layer or duo-layer of particles. For example, when a powder having a particle size less than 15 $\mu$m is suspended in the bath, due to the refinement, it is possible to put down, as desired, a substantially continuous 12 or 10 $\mu$m mono-layer of particles (the largest as-deposited particles being 12 or 10 $\mu$m in size respectively) although in practice, it is unlikely that for any given desired thickness of coating one would employ powders having particles of a size greater than this desired thickness. In another preferred process, 4 to 8 $\mu$m powder may be used to provide a duo-layer or trio-layer substantially 10, 12, 15 or 20 $\mu$m thick, as desired.

In one embodiment, the substrate onto which co-deposited material is applied comprises a superalloy component which may comprise a component of a gas turbine. In another embodiment, the co-deposited material may be applied on top of a Ni flash (eg 2 $\mu$m thick) plated on the surface of the superalloy component. After co-deposition, the co-deposited material may consist of more than 40% (by volume) of the particles, and in some applications, 45% may be exceeded.

During the co-deposition process, gas, such as air or an inert gas, may be admitted to the bath at a location to produce circulation in the solution generally upwards in one zone and generally downwards in a second zone, the substrate being located in the second zone during co-deposition. The substrate (or component of which it forms part) may be rotated about an axis which is horizontal or has a horizontal component during co-deposition. Electrodeposition apparatus as described in our patent GB-B-2182055 may be used.

In some circumstances, it may be desirable to rotate the substrate about a first axis having a horizontal component, and to rotate the substrate about a second axis which is non-parallel with the first. The cycle of rotation about the first axis may include periods of higher angular velocity and periods of lower angular velocity. The second axis may be perpendicular to and/or intersect the first axis. The cycle of rotation about the first axis may be alternately stop and go. When the substrate is only rotated about one axis having a horizontal component, the rotational cycle may include periods of higher angular velocity and periods of lower angular velocity, and rotation may also be alternately stop and go. Manipulation of the substrate may be in accordance with the process described in our patent GB-B-2221921.

In a most preferred embodiment, the co-deposited material is subsequently aluminised, for example by pack or vapour phase aluminising. A pre-diffusion heat treatment may be included between the co-deposition and the aluminising. Following the aluminising step, a post-diffusion heat treatment may be employed, preferably followed by an age hardening step.

A platinum deposition step may be included before or after aluminising, preferably before. The platinum deposition preferably comprises plating a layer of platinum (in the region of 5 to 10 $\mu$m thick) on top of the co-deposited material. The pre-diffusion step preferably comprises subjecting the co-deposited material (and, optionally, the platinum layer if there is one) to between 1000° and 1100° C. for approximately one hour in vacuum. When a pack aluminising process is used, this preferably occurs at approximately 900° C. for approximately 6 hours. The post-diffusion step preferably comprises subjecting the aluminized coating to approximately 1100° C. for approximately one hour in a vacuum. The age hardening step preferably comprises subjecting the post-diffused coating to approximately 870° C. for approximately 16 hours in a vacuum.

One preferred process involves the application of a substantially 15 $\mu$m thick layer of co-deposited material to the substrate, followed by aluminising or platinum aluminising, and heat treatment. After heat treatment, the total thickness of coating material on the superalloy is preferably less than 75 $\mu$m.

The substrate may comprise any gas-washed substrate of a gas turbine component, such as the aerofoil, root or shroud portions of a blade.

In addition to or as an alternative to aluminising or platinum aluminising the co-deposited material as discussed above, a thermal barrier layer, for example of columnar material, may be deposited as a final layer. The thermal barrier may comprise a ceramic material, such as yttria-stabilised zirconia.

According to a fourth aspect of the present invention there is provided a method of manufacturing or overhauling a gas turbine component which includes coating a substrate of the component according to any one or more of the first second and third aspects of the invention.

According to a fifth aspect of the present invention there is provided a gas turbine component or a gas turbine including a component manufactured or overhauled according to the fourth aspect of the invention.

According to a sixth aspect of the present invention there is provided a vehicle or a fixed installation including a gas turbine according to the fifth aspect of the invention. A vehicle according to this aspect of the invention may comprise, for example, an aircraft, or a water or land vehicle.

Figure 2:
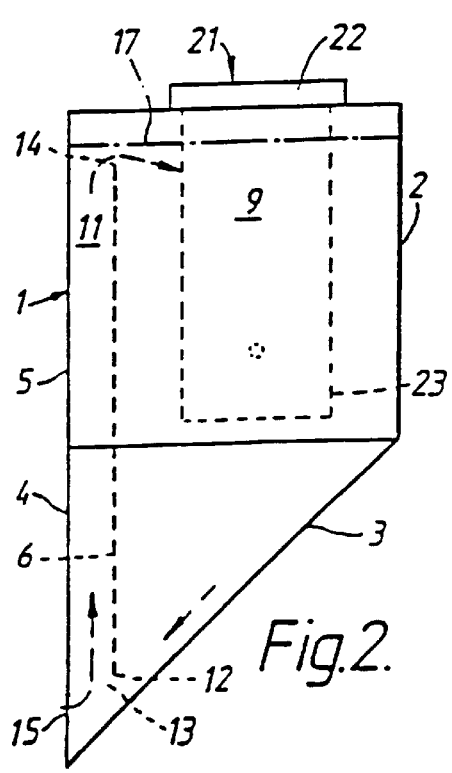
Figure 3:
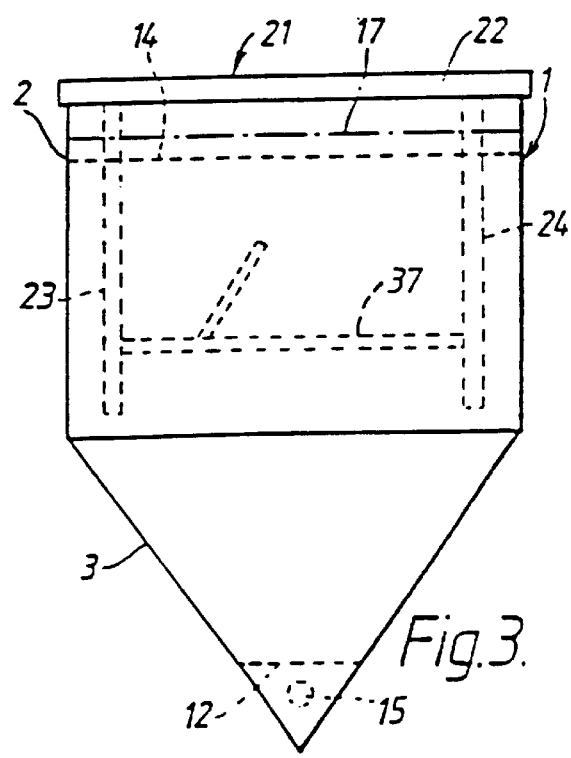
Figure 4:
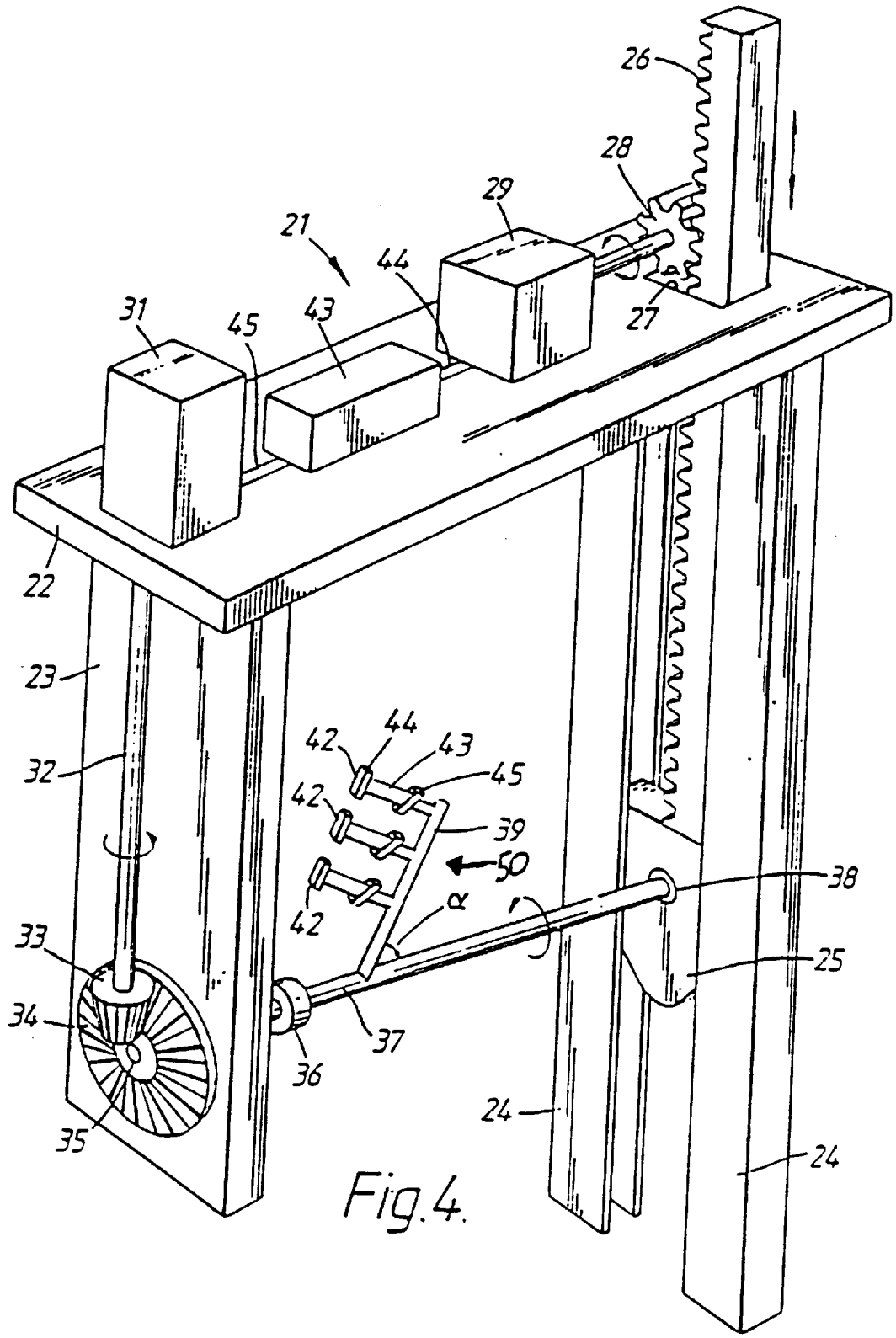

The invention may be performed in various ways but one method of coating will now be described by way of example with reference to the accompanying diagrammatic drawings, in which:

FIG. 1 is a perspective view of a coating apparatus;
FIG. 2 is a side elevation of the apparatus;
FIG. 3 is a front elevation of the apparatus; and
FIG. 4 is a perspective view of a jig on which the articles to be plated are suspended.

The apparatus shown in the drawings, comprises a vessel or container 1 having a parallelepiped shaped upper portion 2 and a downwardly tapering lower portion 3 in the form of an inverted pyramid which is skewed so that one side face 4 forms a continuation of one side face 5 of the upper portion.

The vessel 1 contains a partition 6 which lies in a vertical plane parallel to the side faces 4 and 5 of the vessel and makes contact at its side edges 7 and 8 with the adjacent vertical and sloping faces of the vessel. The partition thus divides the vessel into a larger working zone 9 and a smaller return zone 11. At its bottom, the partition 6 terminates at a horizontal edge 12 above the bottom of the vessel to afford an interconnection 13 between the working zone 9 and the return zone 11. At its top, the partition 6 terminates at a horizontal edge 14 below the top edges of the vessel 1.

At the bottom of the return zone 11 there is an air inlet 15 which is connected to an air pump (not shown) Mounted in the working zone 9 is a jig 21 to which the workpieces to be coated are mounted, the jig 21 being arranged to move the workpieces within the vessel in a manner to be described in greater detail below.

When the apparatus is to be used for electrolytic plating, conductors are provided to apply a voltage to the workpiece mounted on the jig 21 relative to an anode which is suspended in the working zone.

To use the apparatus, to co-deposit a coating on the workpieces, the workpieces are mounted on the jig 21 which is positioned in the vessel as shown. Before or after the positioning of the jig, the vessel is filled to a level 17 above the top edge 14 of the partition 6 with a plating solution containing particles to be co-deposited. Air is admitted to the inlet 15 and this rises up the return zone 11, raising solution and entrained particles. At the top of the return zone, the air escapes and the solution and particles flow over the broad crested weir formed by the top edge 14 of the partition and flow down past the workpieces on the jig 21. At the bottom of the working zone 9, the particles tend to settle and slide down the inclined sides of the vessel towards the interconnection 13 where they are again entrained in the solution and carried round again.

As the downwardly travelling particles in the working zone 9 encounter the workpiece, they tend to settle on the workpiece where they become embedded in the metal which is being simultaneously plated out.

As shown in FIG. 4 and as described in GB-B-2 254 338, the workpieces to be coated are mounted on a jig 21 shown in FIG. 4 which is suspended in the vessel 1. The jig is shown in simplified form in FIGS. 2 and 3 but omitted from FIG. 1 for reasons of clarity. The jig 21 comprises a deck 22 which fits over the top of the vessel 1, a depending pillar 23 towards one end and a pair of depending guides 24 at the other end. The guides 24 have facing guideways in which slides a cross-head 25 carrying a vertical rack 26 which passes upwards through a hole 27 in the deck 22 and meshes with a pinion 28 driven by a reversible electric motor 29. The deck 22 supports a second electric motor 31 which drives a vertical shaft 32 carrying a bevel pinion 33 which engages a crown-wheel 34 fixed to one end of a spindle 35 mounted in the pillar 23. The other end of the spindle 35 is connected by a universal joint 36 to one end of a shaft 37 the other end of which is carried by a spherical bearing 38 in the cross-head 25.

The shaft 37 carries a plurality of spurs which are rigidly attached thereto, only one spur 39 being shown in FIG. 4. The spur 39 extends in a plane containing the axis of the shaft 37 with the longitudinal axis of the spur making an angle $\alpha$ with the axis of the shaft 37. Mounted on the spur 39 and spaced therealong are three gas turbine blades 42 to be coated, with the longitudinal axes of the blades extending in the said plane and perpendicular to the longitudinal axis of the spur 39 so that the longitudinal axes of the blades make angles of $(90-\alpha)°$ to the axis of the shaft 37.

An electronic motor controller 43 is mounted on the deck 22 and is connected by lines 44 and 45 to the motors 29 and 31. The controller 43 is designed to drive the motor 31 in one direction only but with a stop so as to rotate the shaft 37 about a nominally horizontal axis (the x-axis). The controller 43 is designed to drive the motor 29 alternately in opposite directions to reciprocate the cross-head 25 and so superimpose on the rotation about the x-axis an oscillatory rotation about a rotating axis in the universal joint 36 (the y-axis).

The angle $\alpha$ and the parameters of the cycles executed by the motors 29 and 31 are selected to suit the workpiece being coated so as to ensure that all surfaces to be coated spend sufficient time facing generally upwardly to receive an adequate loading of descending particles to be incorporated in the plated metal as it is deposited. One particular example of a coating and the method of production thereof will now be described by way of example.

EXAMPLE

The coating is to be produced on a gas turbine blade 42 having an aerofoil section 43 with a root portion 44 at one end and a shroud portion 45 at the other end, the platforms of the root and shroud both extending at angles of approximately 70° to the axis of the aerofoil portion and the root portion and the shroud portion having end faces which extend at respectively 30° and 40° to the circumference of the ring of which the blade forms part. For blades of this geometry the angle $\alpha$ is 70°.

It is intended to produce on the aerofoil and platform portions of the blade a coating containing 18.32 weight percent Cr, 8.25 weight percent Al, 0.457 weight percent Y and the remainder cobalt. To produce such a coating the bath is filled with a cobalt plating solution comprising 400 grams per litre of $CoSO_4 \cdot 7H_2O$, 15 grams per litre of NaCl and 20 grams per litre of boric acid $H_3BO_3$.

The bath is maintained at a pH of 4.5 and a temperature of 45° C. The bath is loaded with powder to a concentration of 10 grams per litre, the powder having a size distribution of 5 to 12 micrometres and being composed of 67.8 weight percent chromium, 30.1 weight percent aluminium and 1.7 weight percent yttrium. The size distribution of the powder in percentages is as follows: 0–2 $\mu$m 0.01, 2–4 $\mu$m 0.05, 4–6 $\mu$m 0.13, 6.8 $\mu$m 4.43, 8–10 $\mu$m 43.61, 10–12 $\mu$m 51.77.

Prior to coating the parts of the root and shroud portions which are not be plated are given a wax mask and the remaining surfaces are given the conventional preparation treatments appropriate to cobalt plating.

The blade is fixed to a jig 50 with its axis (see FIG. 4) at 20° to the x axis of the jig which is horizontal. During plating the x axis of the jig is oscillated plus and minus 25° about the y axis which is perpendicular to 20 the x axis with a cycle time of 3 minutes.

Simultaneously, the jig is rotated about the x axis unidirectionally and through 360° with a cycle time of 10 minutes for a complete revolution. However the rotation about the x axis is intermittent with 10 second stop periods being interspersed with 3 second go periods.

Plating is carried out with a current density of 1.5 amps per square centimetre for a period sufficient to produce a coating thickness of substantially 12 microns.

A coating of excellent qualities is produced covering the aerofoil portion and the root and shroud platforms and having a weight fraction of incorporated powder of 0.27.

The smaller particles are plated preferentially and substantially none of the as-deposited particles are >12 $\mu$m in size, the larger particles remaining in the plating solution (ie those between 12 and 15 $\mu$m). After removal of the coated blades from the jig, the masking is removed.

The coated surfaces may then be platinum aluminized by electro plating thereon a 10 $\mu$m deposit of platinum, pre-diffusing at between 1000° and 1100° C. for one hour in vacuum, pack aluminising at 900° C. for 6 hours, post-diffusing at 1100° C. for 1 hour in vacuum and age hardening at 870° C. for 16 hours in vacuum. The pack aluminising step may comprise a process with cyclically varying pressure, such as is described in EP-A-0024802.

Palladium or ruthenium could be used instead of or as well as platinum.

Particularly preferred $M_2$ elements are Y, Hf, and Si.

Coatings produced in accordance with the invention have good oxidation resistance and thermal fatigue resistance.

I claim:

1. A method of producing a coating on a substrate which comprises depositing by electrolytic deposition a metal matrix $M_1$ from a bath containing particles of $CrAlM_2$, said bath having a particle distribution of 25 percent between 15 and 12 microns, 45 percent between 12 and 10 microns and 30 percent of less than 10 microns, to co-deposit the particles with the matrix in the form of a layer wherein $M_1$ is at least one element selected from the group consisting of Ni, Co, and Fe and $M_2$ is at least one element selected from the group consisting of Y, Si, Ti, Hf, Ta Nb, Mn, Pt and rare earth elements, said deposition being carried out at a current density of less than 5 mA per square centimeter, the layer being less than 50 microns thick.

2. The method of claim 1 in which either a single or double layer of particles is deposited during co-deposition of the metal matrix and particles.

3. The method of claim 1 which further includes aluminising, chromising or siliconising the co-deposited layer.

4. The method of claim 3 which further includes plating a 5 to 10 micron thick layer of platinum on top of the co-deposited layer.

5. The method of claim 1 which comprises co-depositing a substantially 15 micron thick layer of said metal matrix and said particles on to the substrate, aluminising, chromising or siliconising the co-deposited layer, and heat treatment; wherein if said heat treatment occurs before said aluminising, chromising or siliconising, said treatment comprises subjecting the co-deposited layer to between 1000° C. and 1100° C. for approximately one hour under vacuum, and wherein if said heat treatment occurs after said aluminising, chromising or siliconising, said treatment comprises subjecting the co-deposited layer to about 1100° C. for approximately one hour under vacuum conditions, the thickness of coating material on the substrate after said heat treatment being less than 75 micron.

6. The method of claim 1 which further includes depositing a thermal barrier layer subsequent to said co-deposition.

7. The method of claim 1, wherein the substrate is a gas turbine part selected from the group consisting of an aerofoil, root, shroud, turbine shaft, ring, disc, combustion can ware, stator blade, rotor blade and guide vane.

8. The method of claim 1 wherein said deposition is carried out at a bath loading of less than 40 g/l of the particles.

9. The method of claim 1 wherein the layer is less than 25 micron thick.

10. A method of producing a coating on a substrate to be subjected to a high temperature environment, which comprises depositing by electrolytic deposition a metal matrix $M_1$ from a bath containing particles of $CrAlM_2$, said bath having a particle distribution of 25 percent between 15 and 12 microns, 45 percent between 12 and 10 microns and 30 percent of less than 10 microns, to co-deposit the particles with the matrix in the form of a layer wherein $M_1$ is at least one element selected from the group consisting of Ni, Co, and Fe and $M_2$ is at least one element selected from the group consisting of Y, Si, Ti, Hf, Ta, Nb, Mn, Pt and rare earth elements, said deposition being carried out at a current density of less than 5 mA per square centimeter and at a bath loading of less than 40 g/l of the particles, the layer being less than 25 microns thick.

* * * * *